United States Patent [19]

Hornhardt et al.

[11] Patent Number: 4,798,280
[45] Date of Patent: Jan. 17, 1989

[54] MEASURING DEVICES

[75] Inventors: Hubert L. Hornhardt, Beverley; Geoffrey G. Nuske, Cheltenham, both of Australia

[73] Assignee: Alf. Hannaford & Co. Pty. Ltd., Beverley, Australia

[21] Appl. No.: 528,263

[22] Filed: Aug. 31, 1983

[30] Foreign Application Priority Data

Aug. 31, 1982 [AU] Australia ............................. PF5657

[51] Int. Cl.$^4$ ............................................. B65G 33/32
[52] U.S. Cl. .................................... 198/666; 198/670
[58] Field of Search ............... 198/666, 670, 676, 657, 198/672, 661

[56] References Cited

U.S. PATENT DOCUMENTS

| | | | |
|---|---|---|---|
| 2,279,640 | 4/1942 | Ringmarck | 198/666 |
| 2,783,498 | 3/1957 | Richardson | 198/676 |
| 2,884,145 | 4/1959 | Müller et al. | 198/676 |
| 3,031,064 | 4/1962 | Kline | 198/670 |
| 3,278,001 | 10/1966 | Andrews | 198/672 |

FOREIGN PATENT DOCUMENTS 529213  6/1955  Italy ...................... 198/672

Primary Examiner—Robert J. Spar
Assistant Examiner—Cheryl L. Gastineau
Attorney, Agent, or Firm—Oldham & Oldham Co.

[57] ABSTRACT

A measuring apparatus for measuring quantity of grain passing through a conduit which includes a closely fitting auger within the conduit and a separate auger coaxial with the measuring auger arranged to push the particulate materials into the inlet end of the measuring auger to ensure that this is kept full during the measuring rotation and achieving this with the measuring auger fully within the inlet end of the measuring conduit which will substantially avoid cracking of the grain or other particulate materials.

3 Claims, 1 Drawing Sheet

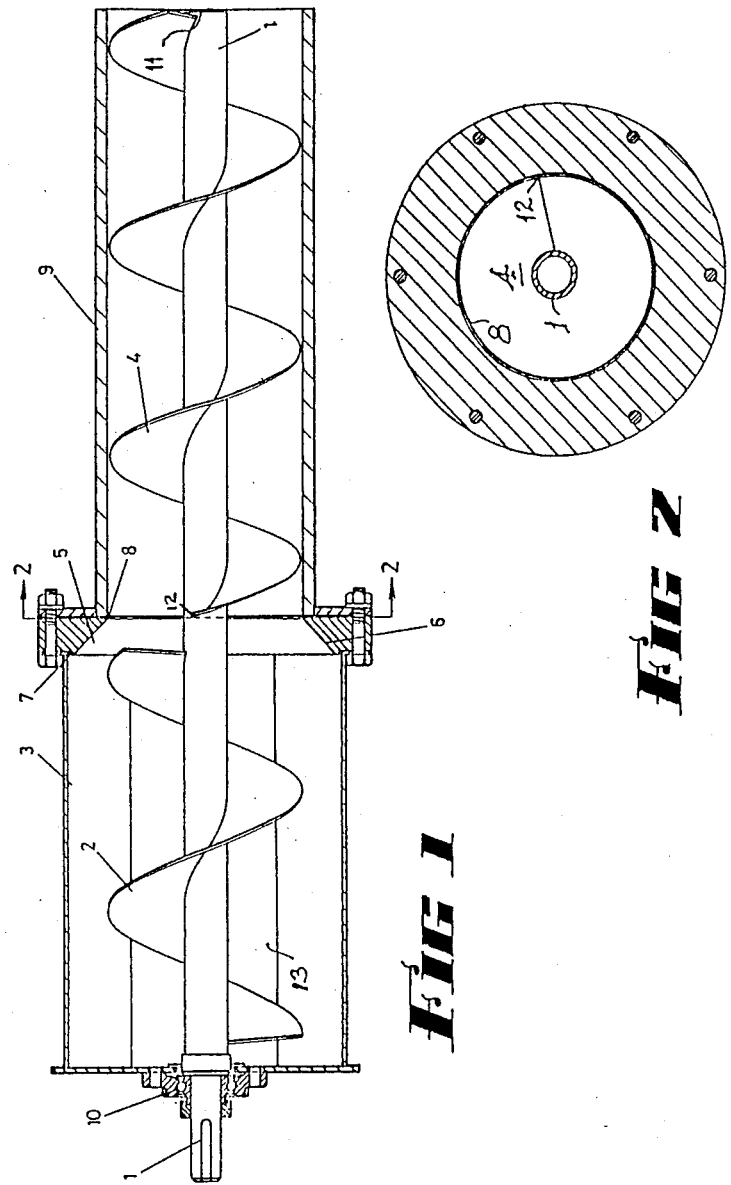

MEASURING DEVICES

This invention relates to measuring devices especially of a type suitable for determining with a reasonably high degree of accuracy a quantity of particulate material passing through a conduit.

The invention has particular application with respect to the measuring of grain where this is supplied through equipment either for the purpose of contract cleaning or for purposes of delivery or otherwise where the quantity of grain actually passing through the conduit is required to be known with some accuracy.

In a conventional arrangement an auger is coaxially supported within a cylindrical conduit the auger being continuous and extending into a supply hopper from whence the material to be measured is drawn into the measuring conduit.

A problem exists with apparatus presently available where this is intended to be used with respect to grain of different types and hence sizes from time to time.

To explain this very significant problem, it must be firstly understood that with presently known equipment, the auger within the measuring conduit has its outer edge a significant distance away from the inner wall of the measuring conduit.

The reason for this is to avoid cracking of the grain.

The distance that each auger edge is separated from the inner wall is governed by the thickness of the thickest grain that might be required to be handled and is based on the distance being approximately twice the diameter of the largest grain to be put through the measuring apparatus.

With such a clearance however, when grain has a very small diameter, there will be a significant quantity of this material which will generally by-pass the auger and the quantity of grain which passes through the measuring conduit will then no longer be directly proportional to the extent of rotation of the auger but will depend also upon other factors such as the type of grain, the diameter of the grain, the smoothness of the inner wall defining the inner conduit, the dampness of the grain and so on.

This will mean calibration based on revolutions may no longer be accurate.

A second very significant problem is that if the device is used for one type of grain and then a second type of grain is to be used, it becomes very difficult to ensure that all of the first grain is removed from within the measuring conduit especially where this will be able to fall to a lowermost position in the conduit and avoid the effect of the auger.

On the other hand, if the auger is made to neatly fit within the measuring conduit, and generally within the context of the specification this will mean that the gap between the auger outer edge and the inner bore of the measuring conduit when coaxially aligned is less than the diameter of grain to be fed through the apparatus, at least with previously known equipment, this would result in at least the auger edge at the inlet end of the conduit being able to grip and crack grain which is regarded as highly undesirable.

This is then the problem to which this present invention is directed.

The invention can be said to reside in measurement apparatus of a type including a conduit with an inner cylindrical bore, a measuring auger within the conduit supported by a shaft being co-axial with the cylindrical bore so that rotation of the measuring auger about its axis can effect passage of particulate materials such as grain therethrough and being such that with adequate particulate material at an inlet end of the conduit, rotation of the auger with respect to the conduit will effect passage of such particulate material therethrough proportionately to the extent of rotation of the auger, the arrangement being characterised in that there is provided adjacent the inlet end of the conduit, means to push and maintain particulate materials into all of the area of the inlet end of the conduit.

By having the measuring auger closely fitting within the cylindrical bore, and having this of adequate length and held with respect to the horizontal at such an angle as to ensure particulate material will not pass therethrough without being caused to pass by reason of the rotation of the auger, ensures that the particulate material will pass only proportionately with the extent of rotation of the auger.

The problem with such an arrangement however as previously described is that it is necessary to keep the auger full of particulate material especially at the inlet end of the conduit.

This has been previously achieved by extending the auger into a hopper area but this can have the unfortunate result immediately at the inlet end of providing relatively moving effectively converging shaped surfaces namely the outer edge of the auger close to the inner edge of the conduit which cause cracking of the grain.

The solution proposed is to provide means generally separate from the measuring auger which will cause the particulate materials to be pushed and maintained into all of the area of the inlet end of the measuring conduit.

This can then mean that the measuring conduit need no longer start outside of the measuring conduit and in preference can have its start coterminous with the entry end of the measuring conduit.

Indeed by providing that the measuring auger also has its further end coterminous with an outlet end of the measuring conduit, all of the grain of other particulate material can be cleared from within the measuring conduit by simple rotation of the measuring auger.

The importance of such a feature will be readily appreciated by those familiar with the art and the need to ensure that one type of seed or grain is not contaminated by another.

Considering the inlet end of the measuring auger, it has been found preferable to provide a feed auger supported by the axial shaft of the measuring auger and constrained to rotate therewith, the pitch of the said feed auger being greater than the pitch of the measuring auger, the feed auger being located with an outlet end adjacent the inlet end of the measuring cylindrical bore but spaced apart from this to a sufficient extent to allow the particulate materials excess to that being taken by the measuring auger to readily move away therefrom.

Preferably the arrangement of the housing in the vicinity of the measuring conduit is such that there is a first portion of substantially larger diameter having an inclined side terminating in a portion of smaller diameter which comprises the inlet of the measuring bore this then providing a sloping portion at the lowermost portion of the inlet to the conduit which ensures that when the measuring conduit is in its working position (usually horizontal with its axis) then particulate materials will slide onto the door.

The advantage of such an arrangement is that particulate material still remaining within the feed housing area will fall back from the inlet end of the housing to a lowermost area of the feed housing and in a preferred arrangment there is a lowermost door which can be opened to allow such remaining particulate material to fall therefrom.

In order to avoid cracking of the grain, the measuring auger at least where this is coterminous with the inlet end of the measuring conduit has an abruptly inclined edge approaching the auger edge closest to the inlet end of the measuring conduit.

Preferably the feed auger has a diameter of similar size to that of the measuring auger.

Preferably, the measuring auger is constrained with respect to the measuring conduit by a bearing which is located so as to allow the auger to generally find its own centre when being used.

For a better understanding of the invention this will now be described with reference to a preferred embodiment with the assistance of drawings, in which:

FIG. 1 is a cross-sectional view through the preferred embodiment, and

FIG. 2 is a cross-sectional view along the lines 2—2 of FIG. 1.

Refering in detail to the drawings, there is shown shaft 1 in which there is a feed auger 2 which is located within but not closely confined by a surrounding housing 3. On the same shaft 1 so as to be co-axial therewith is a measuring auger 4.

The feed auger 2 has a longer pitch than measuring auger 4 in that in the embodiment, the pitch of the single start auger 2 is six inches whereas the pitch of the single start feed auger 4 is five inches.

The two augers 2 and 4 are separated leaving a transition area 2 surrounded by a frusto-conical shaped portion 6.

Accordingly the portion 6 has effectively a first portion of substantially larger diameter at 7 having the inclined side terminating in a portion of smaller diameter at 8.

The measuring conduit 9 has an inner cylindrical bore within which the measuring auger 4 closely fits and such that the shaft 1 is substantially co-axial with the axis of the said cylindrical bore.

It is to be observed that bearing 10 rotatably supporting the shaft 1 is supported at the furthermost end of the shaft and the housing 3 so that the other end 11 of the shaft will effectively float and therefore effectively be self centring when being operated.

It is to be emphasised that the reference to a co-axial alignment presumes that this is during the working phase of the apparatus.

The clearance between the edge of the measuring auger 4 and the measuring conduit 9 is constrained to be less than the diameter of grain to be measured or of any type of grain to be measured with the apparatus.

Incorporated within the apparatus, are firstly a door 13 in the bottom of housing 3 which can be opened from time to time to allow grain of one type to be evacuated such grain to also fall down the sloping side 6 of the member 5.

The start of the measuring conduit 8 is also the location of the commencement of the measuring auger 4 at its outer edge 12.

As can be seen between FIGS. 1 and 2, there is an abruptly inclined edge approaching the auger edge 12 at the said start or inlet end of the measuring conduit 9.

The design of the apparatus overall including the tolerances of the members forming the parts has to be selected for the purpose intended in any individual case and this most particularly includes the tolerance between the outer edge of the auger 4 and the measuring conduit 9.

The length of the measuring conduit 9 and the number of flight and the pitch of the auger 4 must be such that rotation of the shaft 1 will be a proportionately direct measure of grain being taken through the measuring conduit 9.

In operation, the number of rotations of shaft 1 will be in the arrangement shown effective as a measure of the quantity of grain passing through the measuring conduit 9.

It is of course understood that the housing 3 will be kept full of grain to be measured and the common rotation of the feed auger 2 with a longer pitch that the measuring auger 4 will ensure that the particulate material be it grain or other material will be pushed ianto all of the area of the inlet end of the measuring conduit 9.

The importance of this feature is that in this manner, particulate material will be kept fully filling all of the locality between the flights of auger 4.

By having a gap between the respective augers namely the feed auger 2 and the measuring auger 4 and having the housing not closely confining the augers at the transition area 5 allows excess particulate material to be diverted and passed back into the main body of the housing 3 to be later picked and of course forced once again into the measuring conduit 9.

By having coincidence of the corner or edge 12 with the inlet end 8 of the measuring conduit, the respective edges are not such as they move to catch and crack or cut grain with significant economic detriment.

Subsequent to a particular body of grain being measured, continued rotation of the shaft 1 will ensure that all of the grain is caused to be removed from within the measuring conduit 9 and that remaining in the housing 3 can be removed by an opening of the door below the housing.

Subsequently, further grain or other seed or other particulate material can be poured into the hopper and once the measuring conduit is filled, then again the quantity of grain passing through will be proportionate to the extent of rotation of the shaft 1.

We claim:

1. Measuring apparatus including a measuring conduit having a measuring cylindrical bore, a measuring auger within the cylindrical bore and having an axial shaft coaxial with the bore, the outer edge of the measuring auger closely fitting within the bore and extending continuously along a measuring length, the measuring length commencing at an inlet end of the bore, and terminating at an outlet end of the bore, the measuring auger at the inlet end of the bore having an abruptly inclined edge approaching the auger edge closest to the said inlet end of the bore, a feed auger supported by the said axial shaft and constrained to rotate therewith, the pitch of the feed auger being greater than the pitch of the measuring auger, the feed auger being located with an outlet end adjacent and axially spaced from the inlet end of the bore, and the housing and the feed auger being shaped and otherwise arranged so as to allow particulate material, where this is being urged toward the inlet end of the measuring bore, to be diverted from between the measuring bore and the feed bore, where excess to any take-up of such particulate material by the measuring auger exists.

2. Measuring apparatus as in claim 1 where in the housing at least around a lowermost side adjacent the inlet end of the measuring conduit is inclined with a higher portion closest to the measuring bore the inclination being to such an extent as to cause particulate material as might be used within the apparatus to slide down such slope when the apparatus is operating.

3. Measuring apparatus as in either of claims 1 wherein a door is located and openable below the feed auger.

* * * * *